United States Patent
Marchlewski et al.

(10) Patent No.: US 9,545,958 B1
(45) Date of Patent: Jan. 17, 2017

(54) OFFSET SHEAR PLATE

(71) Applicant: Ford Global Technologies, LLC, Dearborn, MI (US)

(72) Inventors: Jack Marchlewski, Saline, MI (US); John Comiez, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/865,192

(22) Filed: Sep. 25, 2015

(51) Int. Cl.
*B62D 33/00* (2006.01)
*B62D 33/02* (2006.01)

(52) U.S. Cl.
CPC .................... *B62D 33/0207* (2013.01)

(58) Field of Classification Search
CPC ..... B01D 27/08; B01D 35/147; B01D 27/103; B01D 35/15; B61D 45/007; B60R 21/213; B60R 13/025; B60R 21/232; B60R 22/06; B62D 25/04
USPC .......................................... 296/193.1, 29, 30
See application file for complete search history.

(56) References Cited

U.S. PATENT DOCUMENTS

| | | | | |
|---|---|---|---|---|
| 5,427,425 A * | 6/1995 | Droesch | ............. | B62D 33/0273 296/50 |
| 5,685,046 A * | 11/1997 | Neag | ....................... | E05D 3/127 16/334 |
| 5,876,086 A * | 3/1999 | Lagrou | .................... | B60J 5/101 296/146.11 |
| 6,217,097 B1 * | 4/2001 | Rogers, Jr. | ................ | B60P 1/26 296/106 |
| 6,474,723 B2 * | 11/2002 | Czaplicki | ............... | B62D 25/04 296/187.02 |
| 6,595,579 B2 * | 7/2003 | Freitag | .................... | B62D 25/04 296/187.12 |
| 7,229,116 B1 * | 6/2007 | Bruford | ..................... | B60P 3/40 296/26.08 |
| 7,798,562 B2 | 9/2010 | Wrobel et al. | | |
| 8,007,032 B1 | 8/2011 | Craig | | |
| 8,011,721 B2 * | 9/2011 | Yamada | .................. | B62D 25/02 296/209 |
| 8,657,368 B2 | 2/2014 | Freeman et al. | | |
| 8,740,279 B1 * | 6/2014 | McGoff | .................. | E05B 83/20 296/51 |
| 9,126,630 B1 * | 9/2015 | Gallagher | ............ | B62D 27/023 |
| 9,162,715 B1 * | 10/2015 | Marchlewski | ........ | B62D 33/023 |
| 2002/0063438 A1 * | 5/2002 | Rusu | ...................... | B60J 7/1621 296/100.07 |
| 2003/0030295 A1 * | 2/2003 | Brown | ...................... | B60P 3/40 296/26.08 |

(Continued)

FOREIGN PATENT DOCUMENTS

CN      104309698 A    1/2015
JP      2005161890 A    6/2005

*Primary Examiner* — Kiran B Patel
(74) *Attorney, Agent, or Firm* — Jason C. Rogers; Brooks Kushman P.C.

(57) ABSTRACT

A reinforcement plate is assembled inside a D-pillar of a pick-up truck to prevent twisting or matchbox deflection of the D-pillar when an accessory, such as a hydraulic lift gate, is assembled inside the tailgate opening of the pick-up truck. The plate includes a horizontal planar portion that is attached by a front flange to a front wall of the D-pillar. An outer flange connects the plate to an outer wall of the D-pillar. An offset flange is secured to a rear cross member by fasteners inside the D-pillar.

20 Claims, 4 Drawing Sheets

(56) References Cited

U.S. PATENT DOCUMENTS

| | | | |
|---|---|---|---|
| 2005/0023856 A1* | 2/2005 | Zagoroff | B60P 1/26 296/57.1 |
| 2007/0085381 A1* | 4/2007 | Delaney | B62D 25/04 296/193.08 |
| 2009/0070960 A1* | 3/2009 | Elliott | E05D 3/127 16/334 |
| 2009/0072582 A1* | 3/2009 | Elliott | E05C 17/203 296/146.11 |
| 2015/0353147 A1* | 12/2015 | Bernhardt | B23P 11/005 24/377 |
| 2015/0367896 A1* | 12/2015 | Marchlewski | E05B 79/02 296/183.1 |

* cited by examiner

OFFSET SHEAR PLATE

TECHNICAL FIELD

This disclosure relates to pick-up truck box structures in the tailgate area that provide support for accessories such as hydraulic lift gates.

BACKGROUND

Pick-up trucks are characterized by truck boxes in the rear that are used to carry cargo and may also be provided with accessories that provide specialized capabilities. One example of an accessory is a hydraulic lift gate that may be used to lift heavy objects into the pick-up truck box. Hydraulic lift gates and other types of accessories that are mounted at the rear end of the box or in the area where a tailgate is normally attached to the truck box. The truck box structure includes a pair of pillars that extend upwardly from the truck bed on opposite lateral sides of the tailgate. This pillar is normally referred to as the D-pillar.

Accessories such as hydraulic lift gates apply a rearward force to the D-pillar when a load is placed on the hydraulic lift gate. The D-pillar may be constructed as a hollow structure that has a front wall, a rear wall, an inner wall and an outer wall. The load applied to the D-pillar when the rearward force is transferred to the forward face of the D-pillars and may cause twisting or "match-boxing" of the D-pillar. Truck boxes constructed of steel may include a horizontal flange extending inwardly from the inner wall of the D-pillar that is welded to a rear cross member of the truck box.

Pick-up trucks are now being constructed with aluminum bodies including an aluminum truck bed and support structure. Aluminum truck bodies reduce the overall weight of the truck, enhancing fuel economy, increasing payload capacity and improving handling by lowering the center of gravity of the vehicle. Aluminum truck bodies are assembled with rivets, flow-drill screws and adhesives instead of resistance spot welds. Riveting tools require addition clearance for installing the rivets compared to prior art steel flanges that are welded to the rear cross member.

This disclosure is directed to the above problems and other problems as summarized below.

SUMMARY

According to one aspect of this disclosure, an assembly is disclosed that includes a plate that connects a D-pillar of a pick-up truck that includes a front wall and an outer wall to a rear cross member. The plate is attached inside a base portion of the D-pillar including a first flange contacting and parallel to the front wall, a second flange contacting and parallel to the outer wall and an offset portion of the plate contacting and parallel to the rear cross member. A plurality of fasteners connect the first flange to the front wall, the second flange to the outer wall and the offset portion to the rear cross member.

According to other aspects of the disclosure as it relates to the assembly, a third flange may be provided that is placed in contact with and parallel to a rear wall of the D-pillar. The fasteners connecting the first flange to the front wall and the second flange to the outer wall may be rivets. The fasteners connecting the offset portion to the rear cross member may also be rivets or may be threaded fasteners.

The plate may define an opening in a planar portion of the plate that extends between the first and second flanges.

The front wall of the D-pillar may be adapted to receive an accessory that applies a load to the front wall. The outer wall of the D-pillar may extend at an angle of about 90 degrees relative to the front wall. The plate may include a horizontal planar portion that spans the base portion of the D-pillar. The first flange and the second flange may extend in a direction perpendicular to the planar portion.

According to another aspect of this disclosure, a pick-up truck bed is disclosed that comprises a rear cross member, a D-pillar and a reinforcement. The D-pillar defines an inner cavity bounded by a loaded wall and an intersecting wall disposed at an angle to the loaded wall. The reinforcement is disposed in a horizontal plane and is fastened to the loaded wall and the intersecting wall. The reinforcement also includes an offset portion that is adapted to be fastened to the rear cross member.

According to other aspects of this disclosure as it relates to a pick-up truck bed, the loaded wall may be a front wall of the D-pillar. The intersecting wall may be an outer wall of the D-pillar that extends at an angle of about 90 degrees relative to the loaded wall.

The reinforcement may include a horizontal planar portion that spans the inner cavity of the D-pillar. The pick-up truck bed may include a front flange that extends perpendicular to the planar portion and is parallel to a front wall, and an outer flange that extends perpendicular to the planar portion and is parallel to an outer wall. The front flange may be riveted to the front wall and the outer flange may be riveted to the outer wall.

The offset portion may be disposed in the horizontal plane and may extend inward of the D-pillar. The offset portion may be fastened to a top surface of the rear cross member with a threaded fastener or may be fastened with rivets.

The pick-up truck bed may be provided in combination with an accessory that is attached to the loaded wall of the D-pillar to apply a load to the loaded wall. For example, the accessory may be a hydraulic lift gate.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
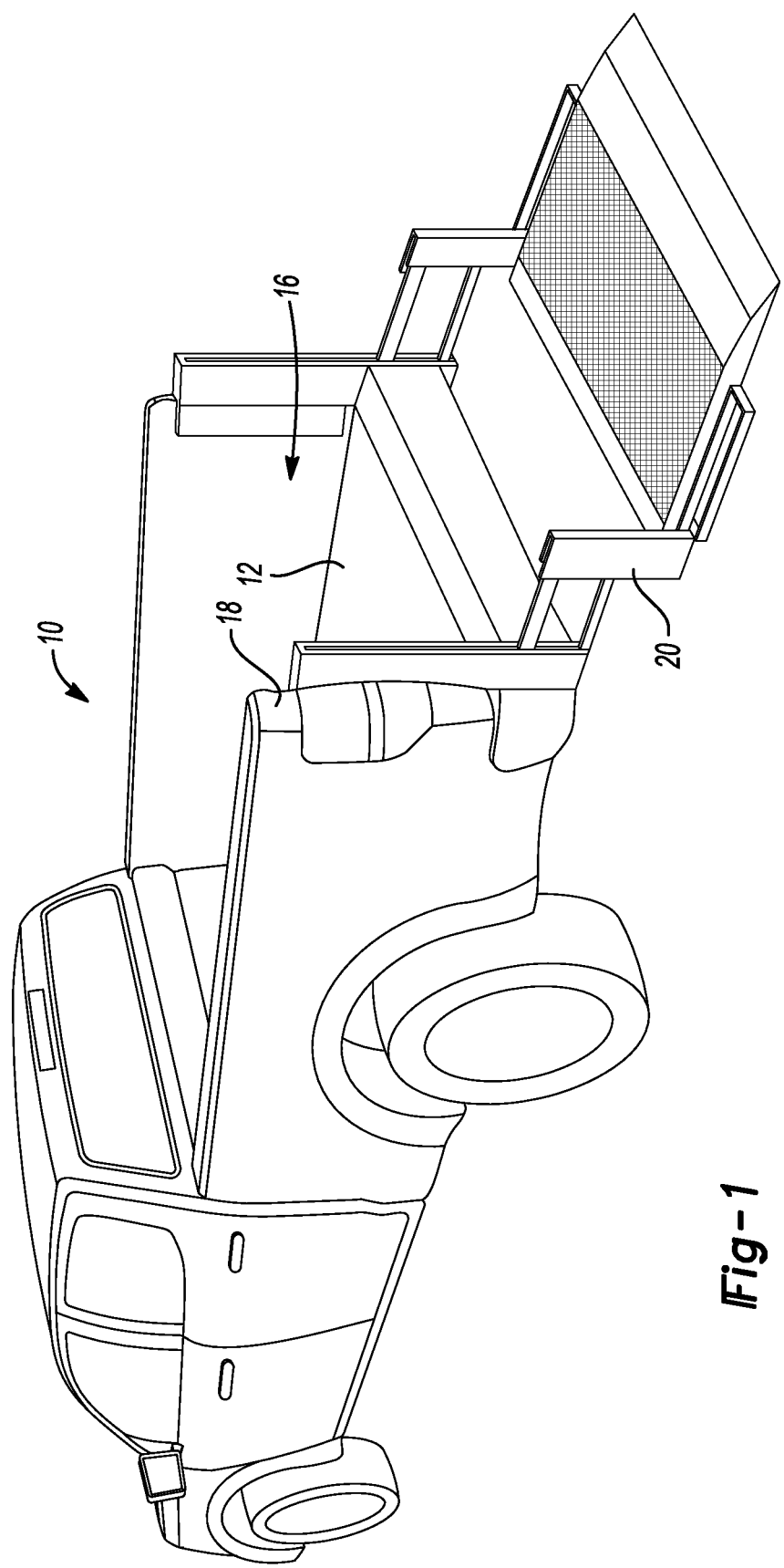
FIG. 1 is a left/rear perspective view of a pick-up truck equipped with a hydraulic lift gate.

Referring to FIG. 1, a pick-up truck 10 is illustrated that includes a bed 12. A tailgate opening 16 is defined at the back end of the bed 12. The lateral sides of the tailgate opening 16 are defined by a pair of D-pillars 18. A hydraulic lift gate 20 is shown disposed at the tailgate opening 16 and attached to the D-pillars 18.

Figure 2:
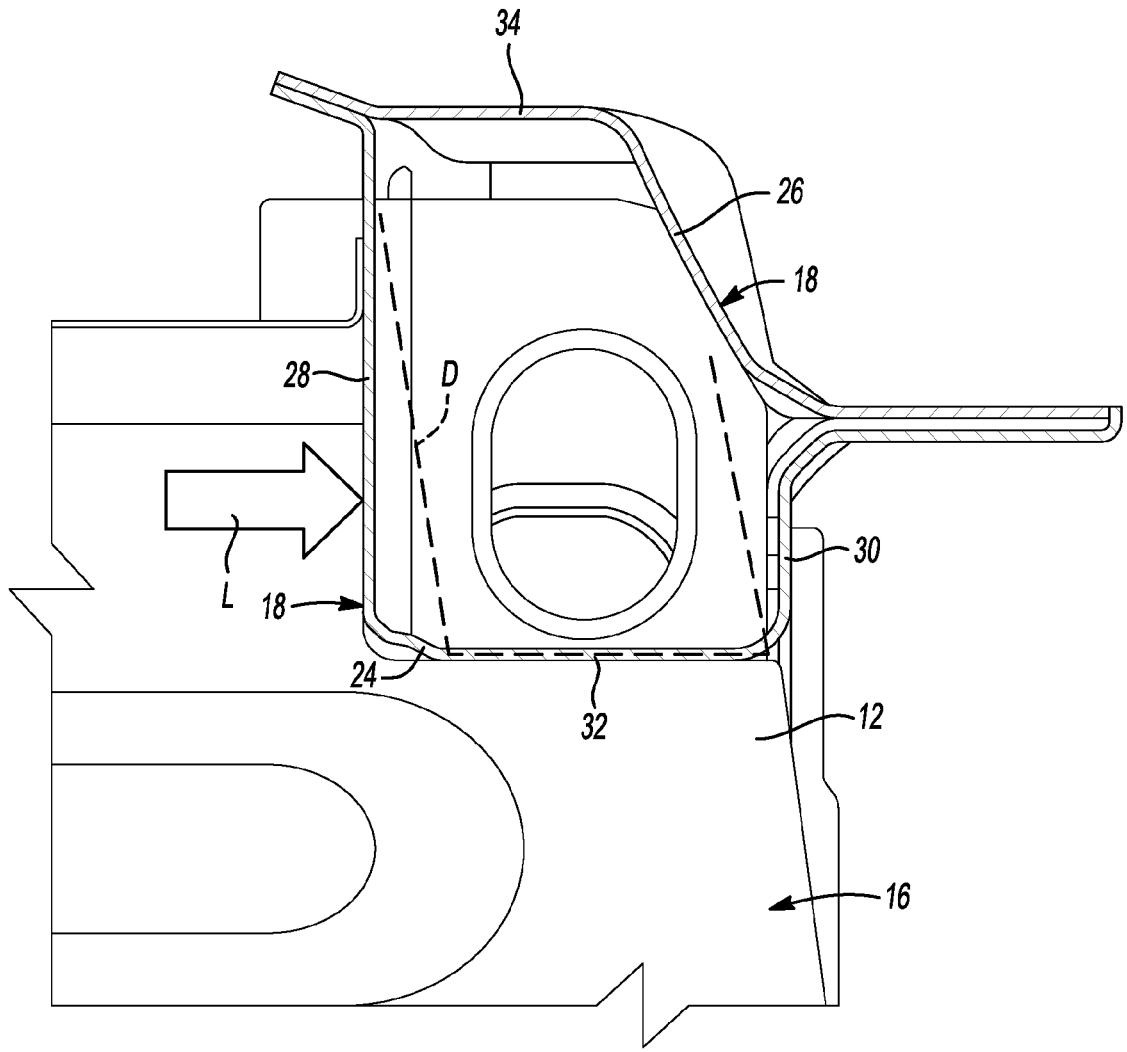
FIG. 2 is a fragmentary partial cross-section view of a rear corner of a pick-up truck bed.

Referring to FIG. 2, a D-pillar 18 is shown to include an inner panel 24 and an outer panel 26. The inner panel 24 includes a front wall 28. A rear wall 30 is defined in part by the inner panel 24 and also by the outer panel 26. An inner wall 32 of the D-pillar 18 extends between the front wall 28 and the rear wall 30. An outer wall 34 is provided on the outer panel 26. A load arrow L represents the loading applied by an accessory, such as the hydraulic lift gate 20, to each of the D-pillars 18. The phantom lines designated D show the twist or matchbox deflection that may occur if a load is applied as illustrated by load arrow L to the D-pillar 18. The matchbox deflection is undesirable and is intended to be eliminated or minimized by reinforcing the D-pillar as described below with reference to FIGS. 3 and 4.

Figure 3:
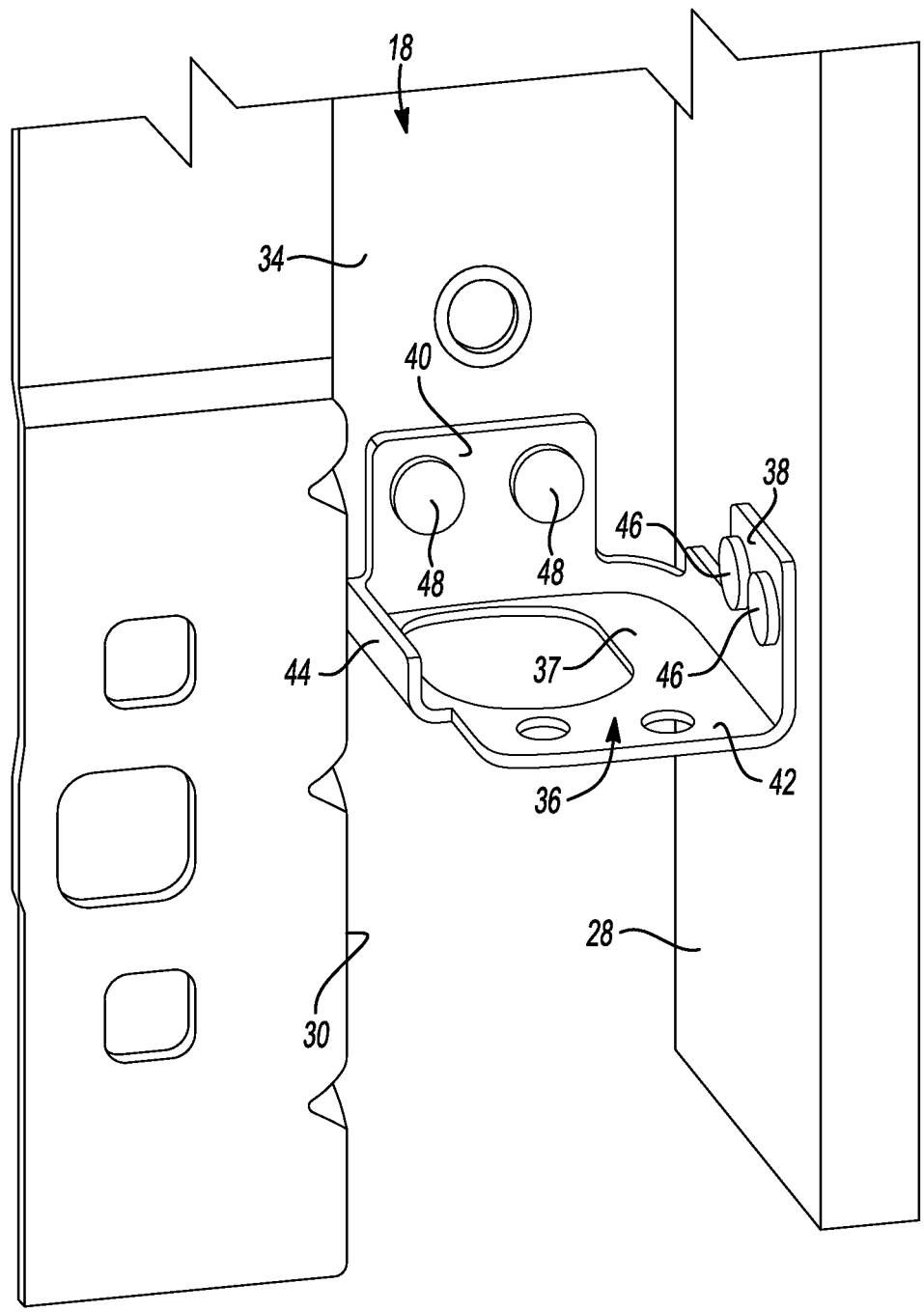
FIG. 3 is a fragmentary perspective view of a D-pillar including an offset shear plate made according to one embodiment of this disclosure.

Referring to FIG. 3, a plate 36 is assembled inside the D-pillar 18 to minimize the twist or matchbox deflection D shown in FIG. 2. The plate 36 includes a front flange 38, or first flange, that is disposed in a face-to-face relationship with the front wall 28. An outer flange 40, or second flange, is shown to be arranged in a face-to-face relationship with the outer wall 34. An offset flange 42, or offset portion, extends away from the outer flange 40 and is confined to the inside of the D-pillar 18. A rear wall flange 44, or third flange, is disposed in a face-to-face relationship with the rear wall 30.

A pair of front flange rivets 46 is utilized to secure the front flange 38 to the front wall 28. A pair of outer flange rivets 48 is utilized to secure the outer flange 40 to the outer wall 34.

Figure 4:
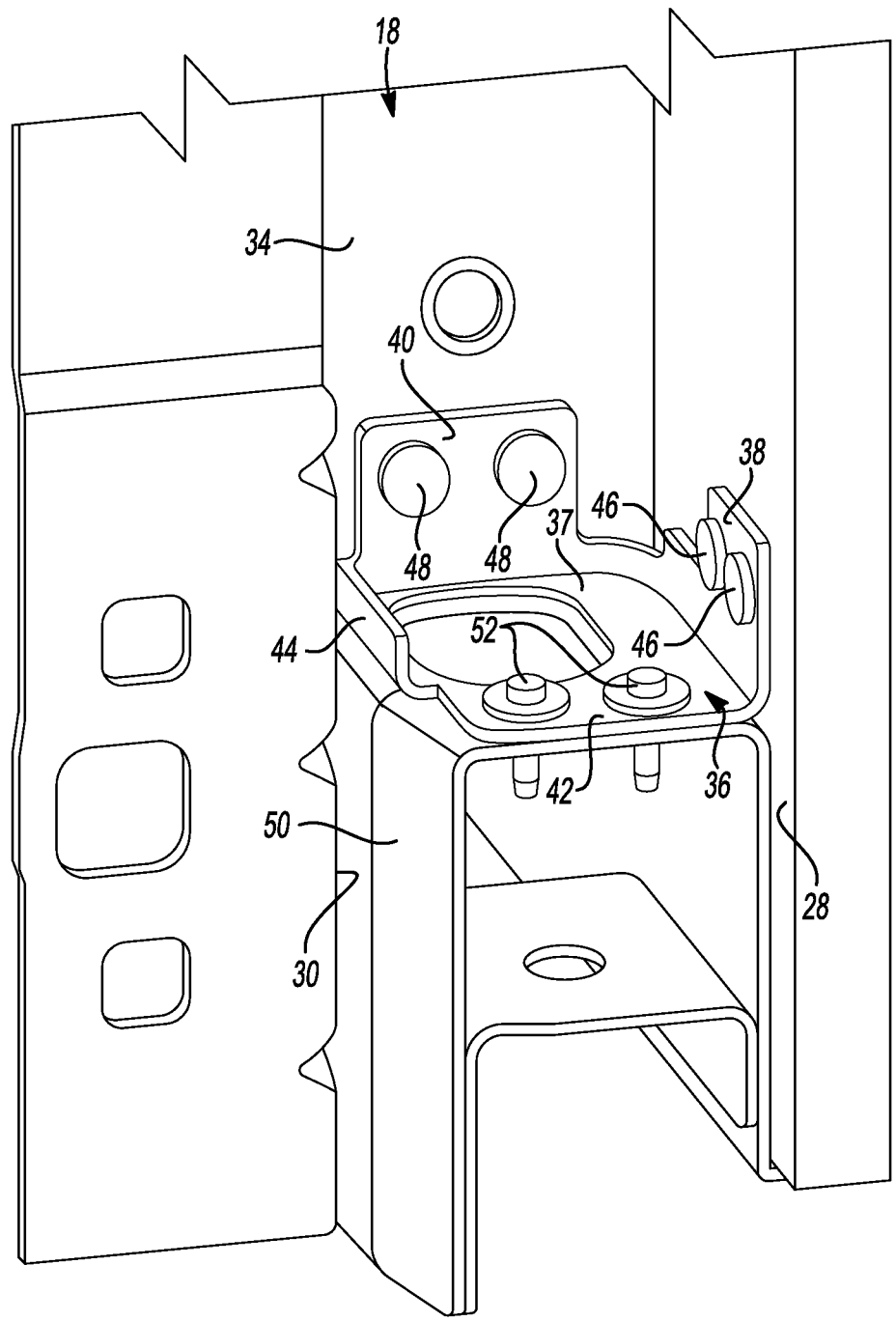
FIG. 4 is a fragmentary perspective view of a D-pillar offset shear plate assembled to the D-pillar of a pick-up truck.

Referring to FIG. 4, the D-pillar 18 is shown with the plate 36 secured inside the D-pillar, as described with reference to FIG. 3, and also attached to a rear cross member 50 that extends across the rear edge of the bed 12 (shown in FIG. 1). The offset flange fasteners 52, that may be threaded fasteners or rivets, secure the offset flange 42 of the plate 36 to the rear cross member 50.

The plate 36 prevents twisting or matchbox deflection (shown in FIG. 2) because the front flange 38 is secured by the front flange rivets 46 to the front wall 28. The outer flange rivets 48 secure the outer flange 40 to the outer wall 34. The rear wall flange 44, as illustrated, is not riveted or otherwise fastened to the rear wall 30, but engages the rear wall 30 in a face-to-face relationship. It should be understood that rivets or other fasteners could be used to connect the rear wall flange 44 to the rear wall 30. The offset flange fasteners 52 secure the offset flange 42 to the rear cross member 50. The offset flange fasteners 52, as illustrated, are threaded fasteners such as bolts or flow drill screws that connect the offset flange 42 to the rear cross member 50 but could also be rivets.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An assembly comprising:
a plate attached inside a D-pillar including a first flange contacting and parallel to a front wall, a second flange contacting and parallel to an outer wall, an offset portion contacting and parallel to a rear cross member; and
a plurality of fasteners connecting the first flange to the front wall, the second flange to the outer wall and the offset portion to the rear cross member inside the D-pillar.

2. The assembly of claim 1 further comprising:
a third flange in contact with and parallel to a rear wall of the D-pillar.

3. The assembly of claim 1, wherein the fasteners connecting the first flange to the front wall and the second flange to the outer wall are rivets.

4. The assembly of claim 1, wherein the fasteners connecting the offset portion to the rear cross member are rivets.

5. The assembly of claim 1, wherein the fasteners connecting the offset portion to the rear cross member are threaded fasteners.

6. The assembly of claim 1, wherein the plate defines an opening in a planar portion of the plate extending between the first and second flanges.

7. The assembly of claim 1, wherein the front wall of the D-pillar is adapted to receive an accessory that applies a load to the front wall.

8. The assembly of claim 1, wherein the outer wall of the D-pillar extends at an angle of about 90 degrees relative to the front wall.

9. The assembly of claim 1, wherein the plate includes a horizontal planar portion that spans a base portion of the D-pillar.

10. The assembly of claim 9, wherein the first flange and the second flange extend in a direction perpendicular to the planar portion.

11. A pick-up truck bed comprising:
a rear cross member;
a D-pillar defining an inner cavity bounded by a loaded wall and an intersecting wall disposed at an angle to the loaded wall; and
a reinforcement in a horizontal plane and fastened to the loaded wall and the intersecting wall, and an offset portion fastened to the rear cross member.

12. The pick-up truck bed of claim 11, wherein the loaded wall is a front wall of the D-pillar.

13. The pick-up truck bed of claim 11, wherein the intersecting wall is an outer wall of the D-pillar that extends at an angle of about 90 degrees relative to the loaded wall.

14. The pick-up truck bed of claim 11, wherein the reinforcement includes a horizontal planar portion that spans the inner cavity of the D-pillar.

15. The pick-up truck bed of claim 14, wherein a front flange extends perpendicular to the planar portion and is parallel to a front wall, and wherein an outer flange extends perpendicular to the planar portion and is parallel to an outer wall.

16. The pick-up truck bed of claim 15, wherein the front flange is riveted to the front wall and the outer flange is riveted to the outer wall.

17. The pick-up truck bed of claim 11, wherein the offset portion is disposed in the horizontal plane and is disposed inside the D-pillar.

18. The pick-up truck bed of claim 17, wherein the offset portion is fastened to a top surface of the rear cross member with a threaded fastener.

19. The pick-up truck bed of claim 11 in combination with an accessory that is attached to the loaded wall of the D-pillar to apply a load to the loaded wall.

20. An assembly connecting a D-pillar of a pick-up truck to a rear cross member, the D-pillar including a front wall and an outer wall, the assembly comprising:
- a plate attached inside a base portion of the D-pillar including a first flange contacting and parallel to the front wall, a second flange contacting and parallel to the outer wall, an offset portion of the plate contacting and parallel to the rear cross member; and
- a plurality of fasteners connecting the first flange to the front wall, the second flange to the outer wall and the offset portion to the rear cross member inside the D-pillar.

\* \* \* \* \*